(12) United States Patent
Chui et al.

(10) Patent No.: US 6,574,033 B1
(45) Date of Patent: Jun. 3, 2003

(54) MICROELECTROMECHANICAL SYSTEMS DEVICE AND METHOD FOR FABRICATING SAME

(75) Inventors: Clarence Chui, Emeryville, CA (US); Mark W. Miles, San Francisco, CA (US)

(73) Assignee: Iridigm Display Corporation, San Francisco, CA (US)

( * ) Notice: Subject to any disclaimer, the term of this patent is extended or adjusted under 35 U.S.C. 154(b) by 0 days.

(21) Appl. No.: 10/084,893

(22) Filed: Feb. 27, 2002

(51) Int. Cl.[7] .................. G02B 26/00; G02F 1/03; G02F 1/07
(52) U.S. Cl. ...................... 359/291; 359/247
(58) Field of Search ................ 359/245, 247, 359/259, 290, 291, 316, 317

(56) References Cited

U.S. PATENT DOCUMENTS

| 5,835,255 A | 11/1998 | Miles ................ 359/291 |
| 6,040,937 A | 3/2000 | Miles ................ 359/291 |
| 6,335,831 B2 * | 1/2002 | Kowarz et al. ......... 359/573 |
| 6,407,851 B1 * | 6/2002 | Islam et al. ........... 359/291 |
| 2002/0021485 A1 * | 2/2002 | Pilossof ............... 359/295 |

* cited by examiner

Primary Examiner—Georgia Epps
Assistant Examiner—William Choi
(74) Attorney, Agent, or Firm—Blakely, Sokoloff, Taylor & Zafman

(57) ABSTRACT

One aspect of the invention provides a method for fabricating a microelectromechanical systems device. The method comprises fabricating an array of first elements, each first element conforming to a first geometry; fabricating at least one array of second elements, each second element conforming to a second geometry; wherein fabricating the arrays comprises selecting a defining aspect of each of the first and second geometries based on a defining characteristic of each of the first and second elements; and normalizing differences in an actuation voltage required to actuate each of the first and second elements, wherein the differences are as a result of the selected defining aspect, the defining characteristic of each of the elements being unchanged.

41 Claims, 10 Drawing Sheets

MICROELECTROMECHANICAL SYSTEMS DEVICE AND METHOD FOR FABRICATING SAME

FIELD OF THE INVENTION

This invention relates to the actuation of microelectromechanical systems devices. In particular, it relates to the actuation or driving of elements in an array in a microelectromechanical systems device.

BACKGROUND

Microelectromechanical systems (MEMS) devices may include arrays of elements wherein the elements are operable between one or more driven and undriven states by the application of an actuation voltage. Depending on the particular microelectromechanical systems device, the elements may include interferometric modulators (IMODs), switches, Infra Red (IR) detectors, etc.

In some microelectromechanical systems devices, it may be necessary to have multiple arrays, wherein each array comprises only elements of a particular type, and wherein each element type requires a different actuation voltage. An example of such a device is the color IMOD-based display described in U.S. Pat. No. 6,040,937, which includes three sets or arrays of IMODs designed to switch between the colors red/black, green/black and blue/black. Each array of IMODS has a different actuation voltage.

Driving the elements in these multiple arrays between their undriven and driven states present a challenge because different actuation voltages are required.

SUMMARY OF THE INVENTION

According to a first aspect of the invention there is provided a microelectromechanical systems device comprising a plurality of elements each having at least two layers disposed in a stacked relationship with a gap therebetween when the element is in an undriven state, the plurality of elements being of at least two different types, each differing in a height of its gap; and a driving mechanism to drive the plurality of elements to a driven state, wherein one of the layers of each element is electrostatically displaced relative to the other layer, and wherein a minimum voltage required to actuate the driving mechanism is substantially the same for each type of element.

According to a second aspect of the invention there is provided a method of fabricating a microelectromechanical systems device comprising constructing an array of elements, each element having a first layer, a second layer spaced from the first layer by a gap when in an undriven state, and an electrode layer to electrostatically drive the second layer to contact the first layer corresponding to a driven state when energized, the elements being of at least two different types which differ in a height of its gap, wherein said constructing includes changing a configuration of each element type to compensate for differences in a voltage required to drive each element to its driven state.

According to a further aspect of the invention, there is provided a microelectromechanical systems device comprising a plurality of elements, each having a first layer, a second layer spaced therefrom by a gap when in an undriven state, and an electrode layer to electrostatically drive the second layer to contact the first layer corresponding to a driven state when energized, the elements being of at least two different kinds, each differing in a height of its gap; and an element driving mechanism comprising an integrated drive circuit having multilevel outputs to energize the electrode layer of each element to cause the element to change from its undriven state to its driven state.

According to yet a further aspect of the invention there is a provided a method for fabricating a microelectromechanical systems device, the method comprising fabricating an array of first elements, each first element conforming to a first geometry; fabricating at least one array of second elements, each second element conforming to a second geometry; wherein fabricating the arrays comprises selecting a defining aspect of each of the first and second geometries based on a defining characteristic of each of the first and second elements; and normalizing differences in an actuation voltage required to actuate each of the first and second elements, wherein the differences are as a result of the selected defining aspect, the defining characteristics of each of the elements being unchanged.

DETAILED DESCRIPTION

Figure 1:
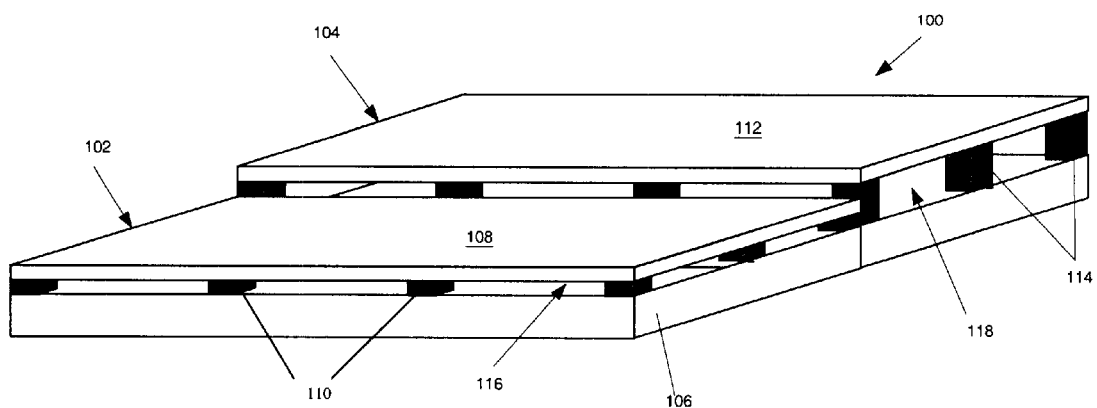
FIG. 1 shows a simplified drawing of a generic MEMs device to which aspects of the present invention apply.

FIG. 1 shows, in simplified form, a generic structure of a microelectromechanical systems (MEMS) device 100 to which aspects of the present invention relate. Referring to FIG. 1, it will be seen that the MEMs device 100 comprises two elements which are designated 102 and 104 respectively. The element 102 and the element 104 each have a common lower or base layer 106. Element 102 has an upper layer 108 which is spaced from the base layer 106 by a number of supports which are in the form of posts 110. Likewise, element 104 has an upper layer 112 which is spaced from the base layer 106 by supports in the form of posts 114. It will be apparent that posts 114 are higher than posts 110 and so the height of a gap 116 between layer 106 and layer 108 is less than that of a gap 118 between layer 112 and layer 106. Because of the differences in the heights of gaps 116 and 118, an actuation voltage required to electrostatically drive layers 108 and 112 respectively from an undriven state, corresponding to the state showing FIG. 1 of the drawings, to a driven state (not shown), in which the layers 106 and 112 contact the base layer 116, is different. Thus, any driving mechanism must take into account these differences in the actuation voltages.

As stated above, FIG. 1 is intended to be a simplified drawing of a generic MEMs device to which aspects of the present invention apply. In actual embodiments, the MEMs device 100 may include multiple arrays each array comprising elements such as the elements 102 or 108. Thus, the elements in each array would require a different actuation voltage. An example of one such MEMs device is provided by the IMOD display described in U.S. Pat. No. 6,040,937. In this example, there are three arrays, each comprising elements in the form of IMODs designed to have a particular optical characteristic which arises from a size of an air gap in each IMOD. Each array comprises only IMODs which have a particular optical characteristic. As a result, different actuation voltages are required to drive the IMODs in each array.

Embodiments of the present invention are concerned with the problem of driving MEMs devices such as are described above, wherein different actuation voltages are required by the elements within th e MEMs device. In describing specific embodiments of the invention, reference will be made to a MEMs device such as is described in U.S. Pat. No. 6,040,937. However, it must be borne in mind that the invention is applicable to any MEMs device comprising elements which each require a different actuation voltage to drive or actuate the element resulting in a geometric configuration or state of the element being changed. Such elements may include IMODs, switches, Infra Red (IR) detectors, etc., where the change in the geometric configuration comprises driving one layer of the element to contact another layer. The layer that is driven will be referred to as the driven layer to distinguish it from the undriven layer.

According to embodiments of the present invention, the actuation voltage required to actuate each of the elements is normalized. This is achieved by changing a geometry of the elements within each array. Naturally, aspects of the geometry of an element which impart a defining characteristic to the element are not changed. Thus, in the case of the IMOD displays of U.S. Pat. No. 6,040,937, the height of the air gap in each element (IMOD) imparts a defining optical characteristic to the IMOD and so the one aspect of geometry of an IMOD that is not changed is the height of the air gap.

Figure 2:
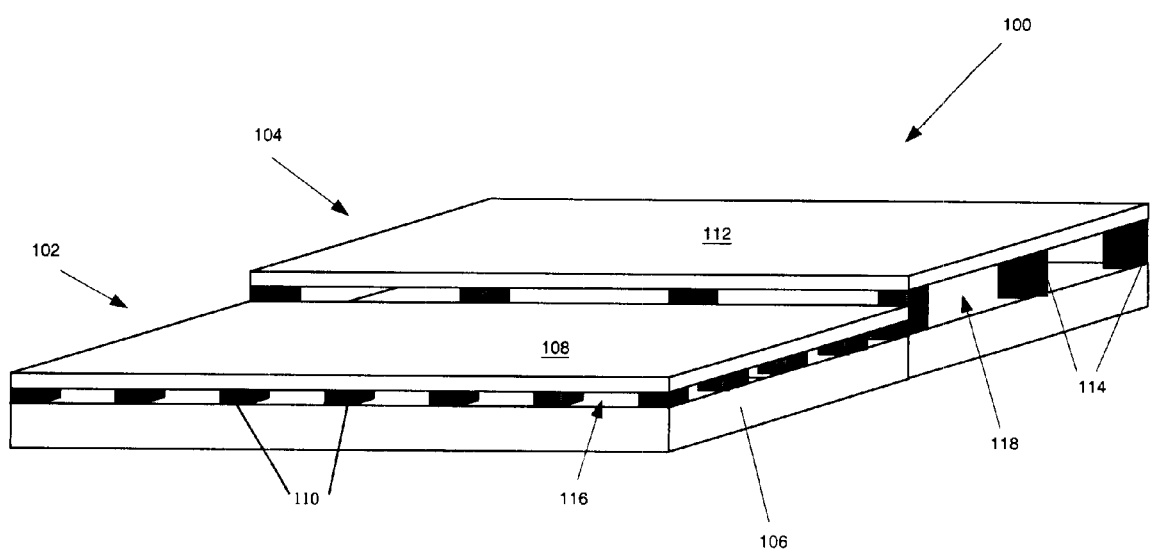
FIG. 2 shows an example of how the geometry of the elements in the MEMs device of FIG. 1 may be changed, according to one embodiment of the invention, to normalize the actuation voltages of the elements.

FIG. 2 of the drawings shows an example wherein the geometry of the element 102 shown in FIG. 1 of the drawings has been changed by increasing the number of posts 110 and by decreasing the spacing therebetween. Thus the layer 108 is supported by posts 110 to a greater degree and therefore a greater actuation voltage will be required to drive layer 108 to contact layer 106. By selecting the number of posts 110 and the spacing therebetween it will be appreciated that the actuation voltages required to drive element 102 and 108 may be normalized.

Figure 3A:
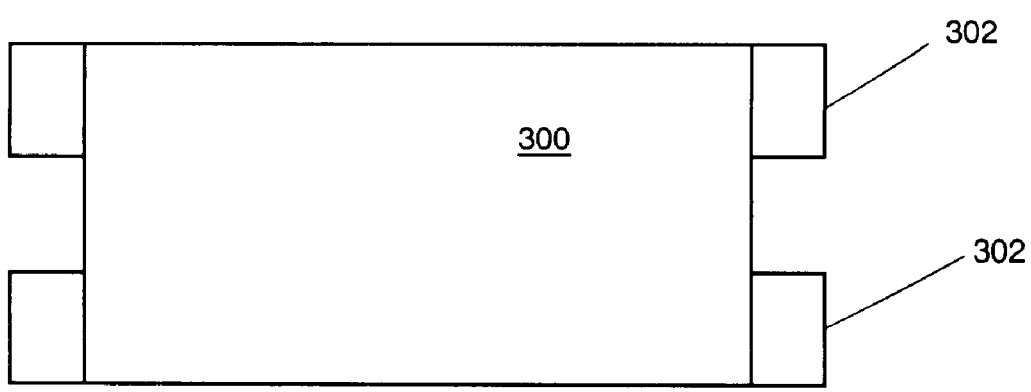
FIG. 3A shows a different geometry for a driven layer of an element, wherein the driven layer has tabs.
Figure 3B:
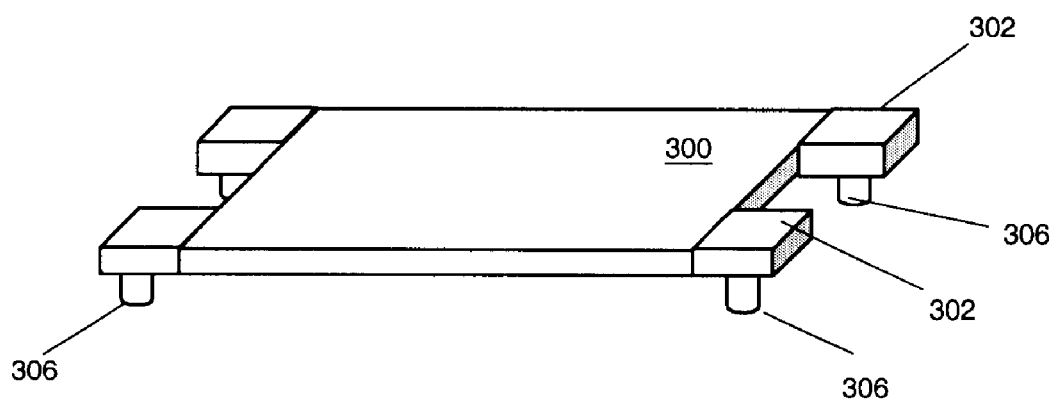
FIG. 3B shows a three dimensional view of the driven layer of FIG. 3A supported on supports.
Figure 3C:
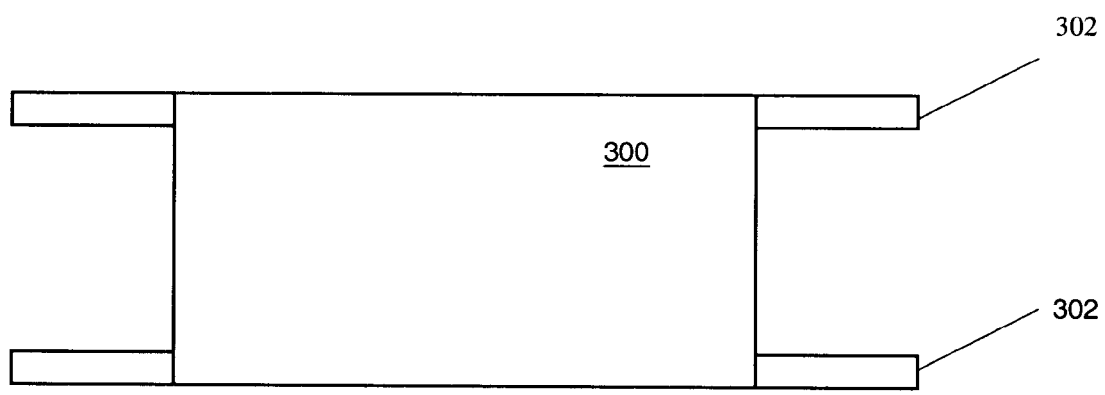
FIG. 3C shows the driven layer of FIG. 3A with a different configuration for the tabs.

In other embodiments, the geometry of the driven layer may be changed in order to increase or decrease the degree of support provided thereto. This is illustrated in FIGS. 3A and 3B of the drawings. Referring to FIGS. 3A and 3B, a layer 300, which is similar to layers 108 and 112 of FIGS. 1 and 2, is shown. The layer 300 has a different geometry to that of layers 108 and 112 by virtue of tabs 302 which form tethers which themselves are supported on posts 304. Thus, the thickness and length of the tabs may be varied to change the degree of support to the layer 300. Assuming that an actuation voltage is required to drive layer 300 into the plane of the drawings it will be appreciated that the tabs 302 in FIG. 3A offer a greater degree of support than the tabs 302 shown in FIG. 3C of the drawings. Thus, a lesser actuation voltage will be required to drive layer 300 in FIG. 3C of the drawings than in FIG. 3A of the drawings. Embodiments of the present invention use the principles illustrated in FIGS. 3A and 3C of the drawings to normalize the actuation voltage required to actuate elements within a MEMs device wherein an operatively upper layer (driven layer) is to be driven towards an operatively lower layer across a gap. When the gap is large, the geometry of the tabs is varied in accordance with the principles shown in FIGS. 3A and 3C to reduce the degree of support provided to the driven layer. On the other hand when the gap is small then the geometry of the supports is varied to provide a greater degree of support to the driven layer. In this way, regardless of the size of the gap through which a layer must be driven, the voltage required to drive the layer can be normalized.

Figure 4:
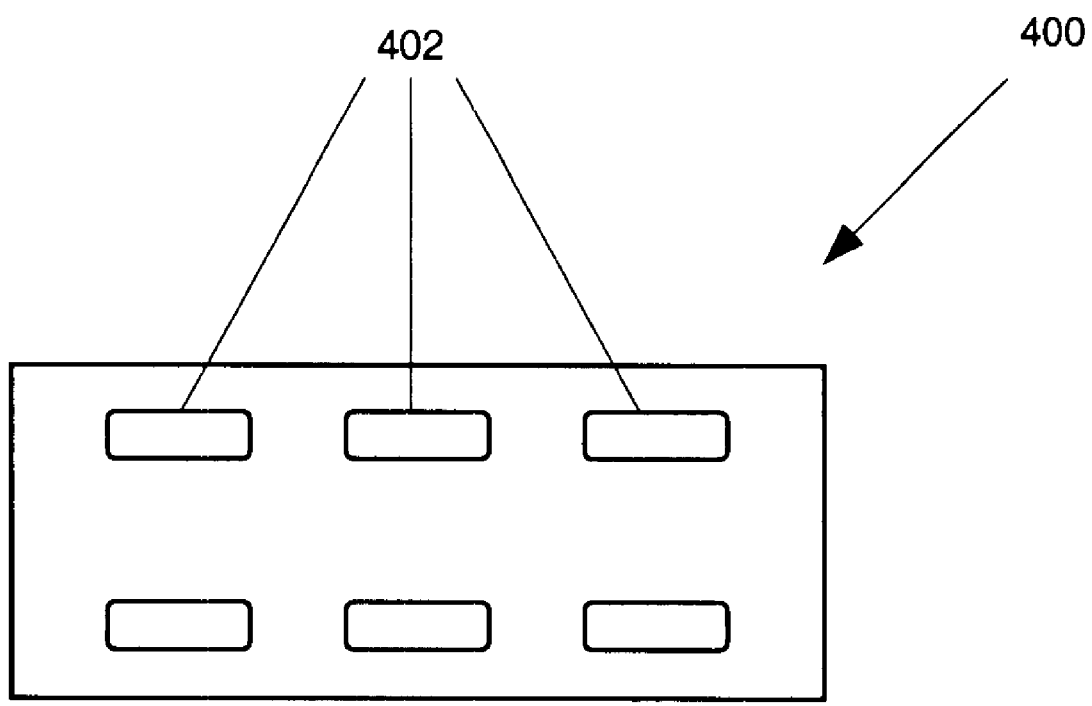
FIG. 4 shows an example of how the configuration of an electrode within each element may be changed in order to achieve voltage normalization in one embodiment of the invention.

Although not shown in FIGS. 1 or 2 of the drawings, a driving mechanism to drive layers 108 and 112 comprises electrodes to electrostatically drive layers 108 and 112 towards base layer 106. The electrodes are disposed on layer 106. An example of an electrode is indicated generally by reference numeral 400 in FIG. 4 of the drawings. According to some embodiments of the present invention, in order to normalize the voltage required to drive or actuate elements within an MEMs device, the configuration of electrode 400 may be changed. Changing the configuration of the electrode may include changing the shape of the electrode or providing apertures therein, for example, such as slots 402 shown in electrode 400. Thus, if a layer is to be driven across a small gap, the electrode may have slots such as slots 402 which serve to reduce the effective electrostatic force created by the electrode. This allows the actuation voltage to be normalized regardless of the height of the gap across which a layer has to be driven.

According to other embodiments of the present invention, changing the geometry of the elements in order to normalize the actuation voltage may include changing the stiffness of the driven layer. One way of changing the stiffness of the driven layer includes changing the Young's Modulus thereof. Thus, the layer which is required to be driven across a small air gap would be made of a material which has a higher Young's Modulus than a layer which has to be driven across a greater air gap.

Another method of changing the stiffness of the driven layer is to form apertures therein to reduce its stiffness. This is shown in FIG. 5, of the drawings where a layer 500 which includes, in addition to tabs 502 apertures or slots 504 formed therein.

Figure 5:
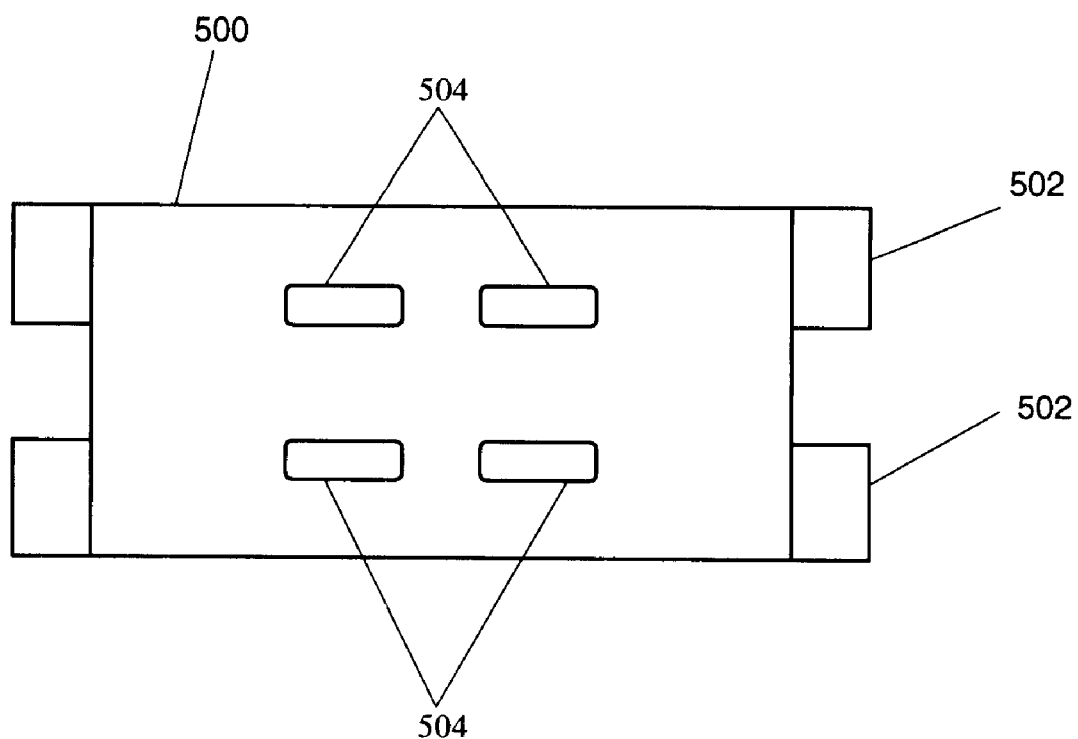
FIG. 5 shows an example of how the stiffness of the layer which is driven in each element may be varied in order to achieve voltage normalization in accordance with another embodiment of the invention.

Various aspects of the present invention may be applied in combination, thus in the example shown in FIG. 5, it will be seen that while layer 500 has slots formed therein, the layer itself will be supported on tabs 502 which have a thickness which is selected so that it provides a degree of support to the layer 500 to allow an actuation voltage required to actuate layer 500 to be normalized.

Figure 6:
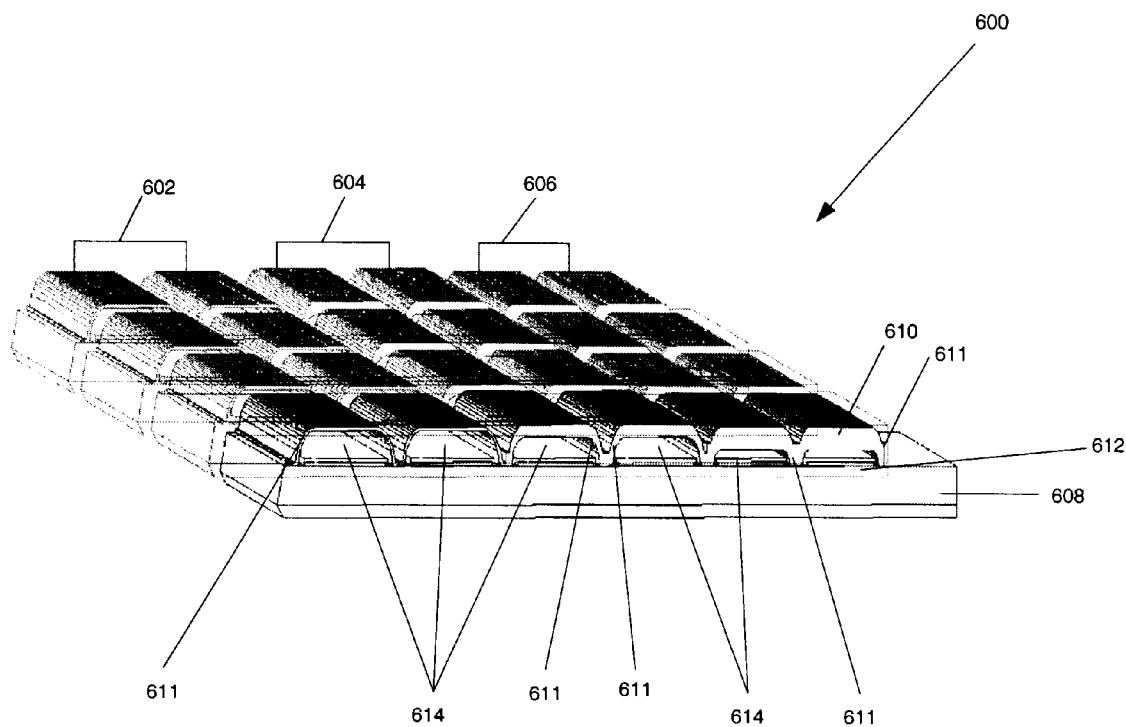
FIG. 6 shows a simplified drawing of an IMOD-based display array wherein the thickness of the layer which is driven within each IMOD is changed in order to achieve voltage normalization, in accordance with one embodiment of the invention.

FIG. 6 of the drawings shows a simplified version 600 of an IMOD based display such as is described in U.S. Pat. No. 6,040,937. The display 600 includes three arrays 602, 604 and 606. Each array is fabricated on a substrate 608 and includes a 2×4 grid of IMODs. Each IMOD includes an upper layer 610 which in use is driven towards a common lower layer 612 across a gap. The layers 610 are self-supporting by virtue of having two downwardly extending limbs 611. Each IMOD has an electrode 614 which is disposed on layer 612. It will be seen that the IMODs within array 602 have the highest gap, the IMODs within array 604 have an intermediate size gap and the IMODs within array 606 have the smallest gap. This is because the IMODs in array 602, 604 and 606 are fabricated to have the defining characteristic that they each reflect red, green, and blue light, respectively, when in an undriven state. Thus, an actuation voltage required to drive the layers 610 towards the layer 612 will increase as the height of the gap through which the layer must be driven increases. Thus, the IMODs within array 602 will require a greater actuation voltage than the IMODs within array 604 or array 606. One embodiment of the present invention allows the actuation voltages to be normalized by changing the thickness of the layers 610 in inverse proportion to the size of the gap through which it must be driven. Thus, in FIG. 6, the thickness of the layers 610 have been selected to normalize the actuation voltages required by the IMODs within each array.

In another embodiment of the invention, the actuation voltages may be normalized by increasing or decreasing the tensile stress of each of the layers 610 as the height of the gap through which the layers must be driven increases or decreases, respectively. This can be accomplished by controlling deposition parameters of the film such as deposition pressure, power, and electric field bias.

Figure 7:
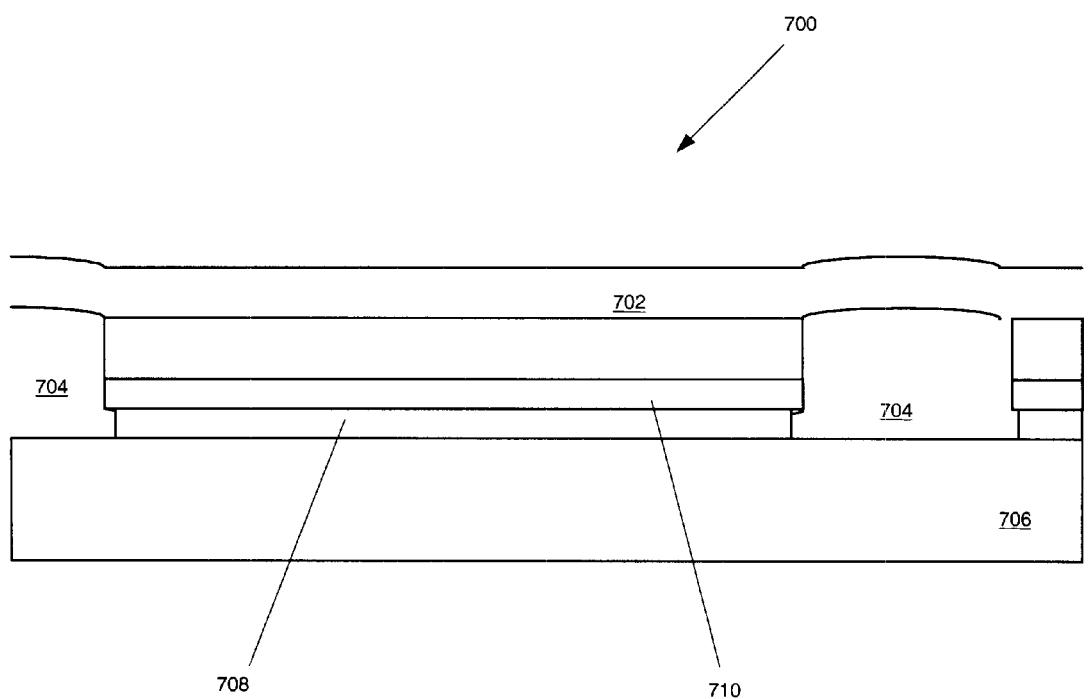
FIG. 7 shows a schematic end view of an IMOD which includes a dielectric stack.

FIG. 7 of the drawings shows an embodiment of a MEMs device 700 which includes an IMOD comprising a mechanical layer 702 which is supported on posts 704 which are formed on a substrate 706. Disposed on substrate 706 is an electrode 708 on which is formed a dielectric stack 710. The space between mechanical layer 702 and dielectric stack 708 defines an air gap. In use, an actuation voltage is applied to drive layer 702 to contact the dielectric stack 710. The device 700 will typically include three sets of IMODs each differing in the height of its air gap so as to reflect red, blue and green light, respectively, when in an undriven state. In order to normalize the actuation voltages required by each set of IMODs, the dielectric constant of the dielectric stack 710 is varied, in one embodiment of the invention, so that the higher the air gap, the greater the dielectric constant. Alternatively, the thickness of the dielectric stack may be varied so that the thickness of the dielectric stack is increased (or decreased) as the height of the air gap is decreased (or increased).

Figure 8:
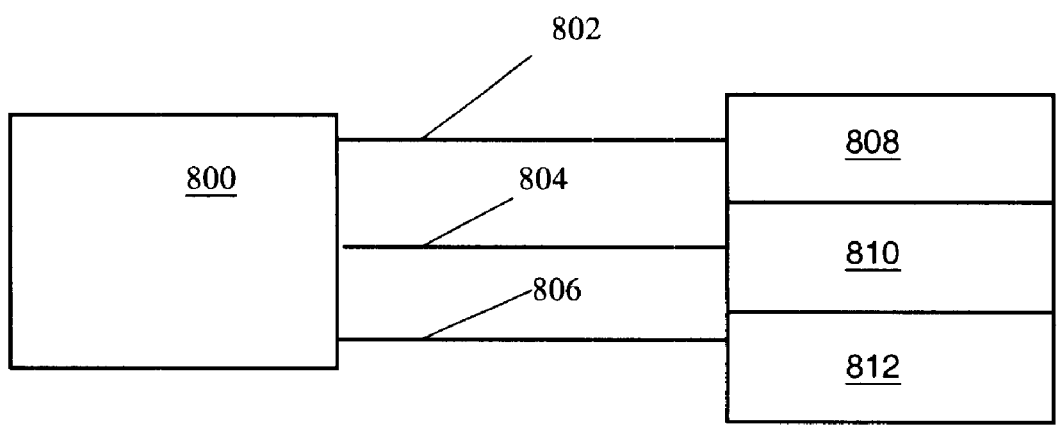
FIG. 8 shows a block diagram of a driver in accordance with one embodiment of the invention.

According to another embodiment of the invention, the problem of driving different elements within a MEMs device wherein the elements require different actuation voltages is solved by providing a driving mechanism such as the one shown in FIG. 8 of the drawings. Referring to FIG. 8, the driving mechanism comprises a driver chip 800 which includes an integrated drive circuit which has multi-level outputs 802, 804, and 806. Each of the outputs 804 to 806 delivers a different voltage and may be used, in one embodiment to drive IMODs with different sized air gaps for example IMODs 808, 810, 812 which reflect red, green, and blue light, respectively, when in an undriven state. The design and integration of components within driver chip 800 is well-known and is therefore is not further described.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A microelectromechanical systems device comprising:
   a plurality of elements each having at least two layers, the layers being disposed in a stacked relationship with a gap therebetween when the element is in an undriven state, the plurality of elements being of at least two different types, each type differing in a height of its gap; and
   a driving mechanism to drive the plurality of elements to a driven state, wherein one of the layers of each element is electrostatically displaced relative to the other layer to close the gap between the layers, and wherein a minimum voltage required to actuate the driving mechanism is substantially different for each type of element.

2. The microelectromechanical systems device of claim 1, wherein the plurality of elements are arranged in an array structure wherein the plurality of elements are substantially co-planar.

3. The microelectromechanical systems device of claim 2, further comprising a plurality of said array structures each containing only elements of one type.

4. The microelectromechanical systems device of claim 1, wherein the electrostatically displaceable layer is self-supporting comprising a plurality of spaced apart limbs which rest on a substrate.

5. The microelectromechanical systems device of claim 3, wherein the layers of each element in an array are continuous, the electrostatically displaceable layer being supported by a support structure comprising a plurality of supports spaced along a first axis and extending in a direction which is transverse thereto, each support having a support surface to support the electrostatically displaceable layer above the other layer when the elements are in the undriven state.

6. The microelectromechanical systems device of claim 5, wherein the spacing between the supports along the first axis in each array depends on the height of the gap between the layers, the higher the gap, the greater the spacing.

7. The microelectromechanical systems device of claim 5, wherein an area of the support surface of each support in an array is a function of the height of the gap between the layers, the higher the gap, the smaller the area.

8. The microelectromechanical systems device of claim 1, wherein the electrostatically displaceable layer of each element has a Young's Modulus which is a function of the height of its gap, the higher the gap, the lower the Young's Modulus.

9. The microelectromechanical systems device of claim 1, wherein a thickness of the electrostatically displaceable layer of each element is a function of the height of its gap, the higher the gap, the smaller the thickness.

10. The microelectromechanical systems device of claim 1, wherein the electrostatically displaceable layer of at least those elements having the highest gap have apertures formed therein to reduce a stiffness thereof.

11. The microelectromechanical systems device of claim 1, wherein the electrostatically displaceable layer of each element is under tensile stress to a degree which increases as the height of its gap decreases.

12. The microelectromechanical systems device of claim 1, wherein the driving mechanism comprises an electrode layer to electrostatically displace the electrostatically displaceable layer when energized, wherein the electrode layers which drive at least those elements having the smallest gap have apertures formed therein to increase the minimum voltage required to energize the electrode layers.

13. The microelectromechanical systems device of claim 1, wherein the electrostatically displaceable layer of each element is formed on a dielectric material having a dielectric constant which is a function of the height of the gap of the element, the higher the gap, the greater the dielectric constant.

14. The microelectromechanical systems device of claim 1, wherein the electrostatically displaceable layer of each element is formed on a dielectric material having a thickness which is a function of the height of the gap of the element, the higher the gap, the lower the thickness.

15. The microelectromechanical systems device of claim 1, wherein the minimum voltage is the same for each kind of element.

16. The microelectromechanical systems device of claim 1, wherein each of the elements defines an interferometric modulator which modulates light.

17. The microelectromechanical systems device of claim 16, comprising three different kinds of interferometric modulators, each differing in a height of its gap to reflect red, blue, or green light, respectively when in the undriven state.

18. A method for fabricating a microelectromechanical systems device comprising:
constructing an array of elements, each element having a first layer, a second layer spaced from the first layer by a gap when in an undriven state, and an electrode layer to electrostatically drive the second layer to contact the first layer corresponding to a driven state when energized, the elements being of at least two different types, each type differing in a height of its gap, wherein said constructing includes changing a configuration of each element type to compensate for differences in a voltage required to drive each element to its driven state.

19. The method of claim 18, wherein the first and second layers of each element in an array are defined by continuous layers which are supported by a support structure comprising a plurality of supports spaced along a first axis and extending in a direction which is transverse thereto, each support having a support surface to support the first layer above the second layer when the elements are in the undriven state, changing the configuration of each element type then comprising changing the spacing between the supports.

20. The method of claim 19, wherein changing the configuration of each element type comprises changing an area of the support surface of each support.

21. The method of claim 18, wherein changing the configuration of each element type comprises using a material having a different Young's Modulus for the second layer of each element type.

22. The method of claim 18, wherein changing a configuration of each element type comprises changing a thickness of the second layer of each element type.

23. The method of claim 18, wherein changing a configuration of each element type comprises forming apertures in the second layers of at least those elements having the highest gap.

24. The method of claim 18, wherein changing a configuration of each element type comprises subjecting the second layer of each element to tensile stress to a degree which is inversely proportional to the height of its gap.

25. The method of claim 18, wherein changing a configuration of each element type comprises forming apertures in the electrode layer of at least those element types having the smallest gap.

26. The method of claim 18, wherein the second layer of each element is formed on a dielectric material, changing a configuration of each element type then comprising changing the dielectric constant of the dielectric material on which the second layer of each element is formed.

27. The method of claim 26, wherein changing a configuration of each element type comprises changing a thickness of the dielectric material.

28. The method of claim 18, wherein the elements are interferometric modulators which modulate light.

29. A microelectromechanical systems device comprising:
a plurality of elements, each element having a first layer, a second layer spaced from the first layer by a gap when in an undriven state, and an electrode layer to electrostatically drive the second layer to contact the first layer corresponding to a driven state when energized, the elements being of at least two different kinds, each kind differing in a height of its gap; and
an element driving mechanism comprising an integrated drive circuit having multilevel outputs to energize the electrode layer of each element to cause the element to change from its undriven state to its driven state.

30. A method for fabricating a microelectromechanical systems device, the method comprising:
fabricating an array of first elements, each first element conforming to a first geometry;
fabricating at least one array of second elements, each second element conforming to a second geometry; wherein
fabricating the arrays comprises
selecting a defining aspect of each of the first and second geometries based on a defining characteristic of each of the first and second elements; and
normalizing differences in an actuation voltage required to actuate each of the first and second elements, wherein the differences are as a result of the selected defining aspect, the defining characteristic of each of the elements being unchanged.

31. The method of claim 30, wherein the normalizing comprises changing other aspects of the first and second geometries without changing the defining aspects.

32. The method of claim 30, wherein the defining aspect comprises a gap between an operatively upper and lower layer of each element, the upper and lower layers being separated by supports.

33. The method of claim 32, wherein each element comprises an electrode to electrostatically drive the upper layer towards the lower layer when actuated by the actuation voltage.

34. The method of claim 33, wherein changing the other aspects comprises changes selected from the group comprising changing a thickness of the upper layer, and changing a distance between the supports.

35. The method of claim 31, wherein the normalizing comprises changing a stiffness of the upper layer of each first and second element.

36. The method of claim 35, wherein changing the stiffness comprises changing the Young's modulus of the upper layer of each first and second element.

37. The method of claim 35, wherein changing the stiffness comprises forming apertures in the upper layer to reduce the stiffness thereof.

38. The method of claim 33, wherein the normalizing comprises changing a configuration of the electrode of each first or second element.

39. The method of claim 38, wherein changing a configuration of the electrode comprises forming apertures therein.

40. The method of claim 30, wherein the elements are formed on a dielectric material, the normalization then comprising changing the dielectric properties of the dielectric material.

41. The method of claim 30, wherein the first and second elements are pixels.

* * * * *